Oct. 6, 1942.    F. L. FENDER    2,297,756
DREDGING APPARATUS
Filed Dec. 21, 1939    2 Sheets-Sheet 1
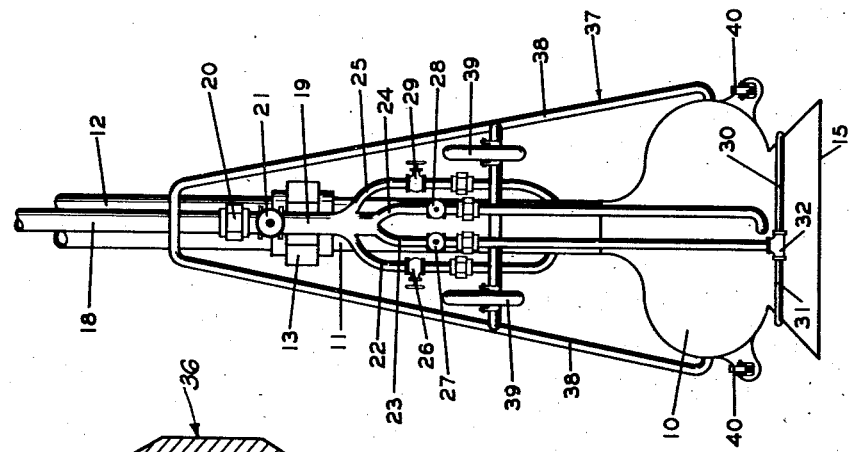
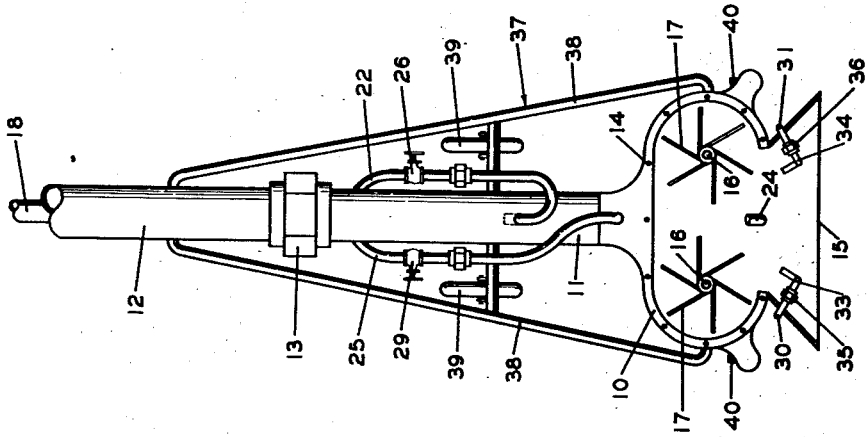
INVENTOR
FRED L. FENDER
BY
ATTORNEY

INVENTOR
FRED L. FENDER

Patented Oct. 6, 1942

2,297,756

UNITED STATES PATENT OFFICE 2,297,756

DREDGING APPARATUS

Fred L. Fender, Pampa, Tex., assignor to Phillips Petroleum Company, a corporation of Delaware Application December 21, 1939, Serial No. 310,464

3 Claims. (Cl. 37—62)

This invention relates to dredging apparatus; and, in its more specific aspects, it concerns dredging apparatus of a character which is particularly adapted to remove liquids, mud, scale, hard lumpy formations, and other accumulations from cooling tower pits, tanks, sumps, and the like.

In cleaning certain types of receptacles, such as cooling tower pits, it has heretofore been the practice to discontinue operation of the cooling tower during the cleaning procedure. This is to permit a crew of men to enter the pit and clean the same with shovels, water hoses, and other necessary equipment. Considerable time is required to properly remove mud, scale, and other semi-solid or solid material from the pit. As is often the case, this operation may require from several hours to a full day during which time the entire plant, as in the case of a natural gasoline plant, must be shut down. It is therefore obvious that the cost of labor and the financial loss incurred, while the unit and interrelated equipment are out of service, present expensive problems in the economic operation of many plants. Furthermore, after the material has been successfully cleaned out of the receptacle, it must be rehandled to load the same into a suitable conveyance before being transported and dumped.

The utilization of the instant invention obviates the difficulties experienced in the past and affords simple, efficient means whereby receptacles of the general class set forth above may be speedily cleaned without interruptions in normal plant operations. The invention in its essential features includes a housing having an inlet and an outlet; a pair of substantially parallel rotors in the housing, each of which is provided with a number of flexible metal blades tangentially arranged thereon; a primary and a secondary high pressure fluid conduit on opposite sides of the rotors for directing accumulated materials against the rotor blades and thence through the outlet; and necessary auxiliary high pressure fluid conduits for creating counter flow when desired. Upon passing through the outlet, the material is conveyed by a discharge conduit directly into a dump truck or other suitable vehicle. This eliminates the need for rehandling the scale, formations and other substances and results in appreciable economies. My present invention further contemplates the use of a rigid framework mounted on casters whereby the complete unit may be easily handled by a single operator.

It is the primary object of this invention to provide dredging apparatus which may be readily and effectively used to remove liquid, semi-solid and solid materials and substances that have accumulated in the bottoms of various types of receptacles.

This invention has for another object the provision of dredging apparatus which may be employed to clean the interior of receptacles, such as cooling tower pits, without interrupting the normal use of the receptacle.

A further object of this invention is to provide dredging apparatus of the character indicated, which apparatus is as simple and sturdy in construction; positive and dependable in operation; and relatively inexpensive to manufacture, operate, and maintain.

These and other objects and advantages will be clearly apparent to those skilled in the art by reference to the following description and annexed drawings which respectively describe and illustrate a preferred embodiment of the invention, and wherein.

Figure 1 is a front elevation view of my invention with the rotor cover plate removed;

Figure 2 is a rear elevation view of my invention;

Figure 5 is a central longitudinal cross section view of a recommended type of ball and socket unit adapted to be employed with my invention.

Figure 3:
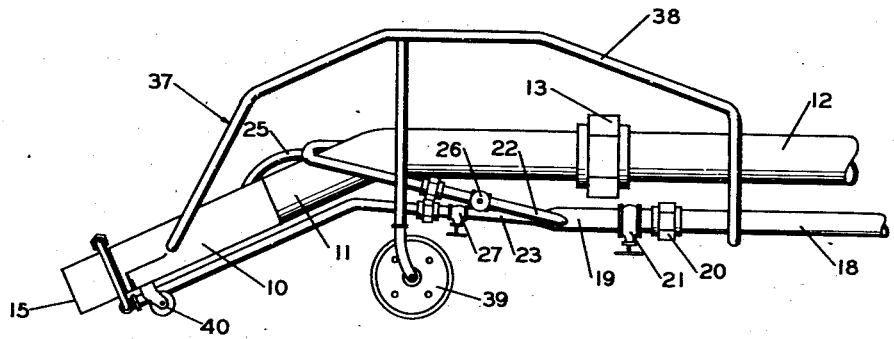
Figure 3 is a side elevation view of my invention.

Referring to the drawings I have denoted therein a dredge housing consisting of a casing 10 and a rigid outlet tube 11 which is placed in communication with a flexible discharge hose 12 by means of a conventional type of coupling 13. An oval shaped cover plate (not shown) is attached to casing 10 at 14 by the usual stud bolts. The casing is provided with a 3-sided flared inlet passage 15 and contains a pair of rotors 16 mounted to freely rotate therein, each rotor having a plurality of tangentially supported blades 17.

While I find that steam is well suited to operate my invention, it should be borne in mind that any suitable gas or liquid under superatmospheric pressure may be employed with equally good results. The steam or other high pressure fluid is conveyed to my apparatus from a conventional source of supply (not shown) by means of a high pressure flexible conduit 18, which is coupled to a rigid high pressure conduit or manifold 19 by a connector unit 20. The passage of high pressure fluid through manifold 19 is controlled by a master valve 21; and passage of fluid through a series of smaller conduits 22, 23, 24, and 25, which are each connected to the manifold, is controlled by valves 26, 27, 28, and 29, respectively. It will be observed that conduits 22, 24, and 25 all project into the housing and have their ends disposed therein so that fluid from conduits 22 and 24 is emitted in an upward direction toward the discharge hose 12, while fluid from conduit 25 is emitted in a downward direction toward the inlet. High pressure fluid from conduit 24 serves as a primary jet for directing materials upwardly through casing 10; fluid from conduit 22 constitutes a secondary jet to supplement the primary jet and urge the materials through outlet tube 11; and fluid from conduit 25 acts as a back flow jet to relieve congestion in the housing inlet or in the casing, should either become clogged or choked up by material which is being handled.

Proceeding next to conduit 23, it will be noted that this particular conduit is placed in communication with two conduits of smaller diameter, namely, 30 and 31, by a T-connector 32. The corresponding conduits are each provided with L-shaped nozzles 33 and 34, which are preferably connected to ball and socket units 35 and 36, respectively. Since the form of ball and socket unit illustrated in enlargement in Figure 5 is well known and since its construction and operation are both self evident, a detailed description of the same is not deemed essential. With nozzles 33 and 34 positioned as shown in Figure 1, fluid from conduit 23 will urge the passage of material through the housing. The nozzles may be readily repositioned, however, so as to direct the fluid forwardly of inlet 15 and thereby loosen and break up accumulations preliminary to removal.

In order to facilitate the handling of my dredge, I find it advantageous to provide the tubular supporting structure generally indicated by reference numeral 37 and including a pair of handle bars 38 and swivel rollers or casters 39 and 40. This arrangement permits a single individual to move the apparatus from place to place and operate the same under various conditions.

Figure 4:
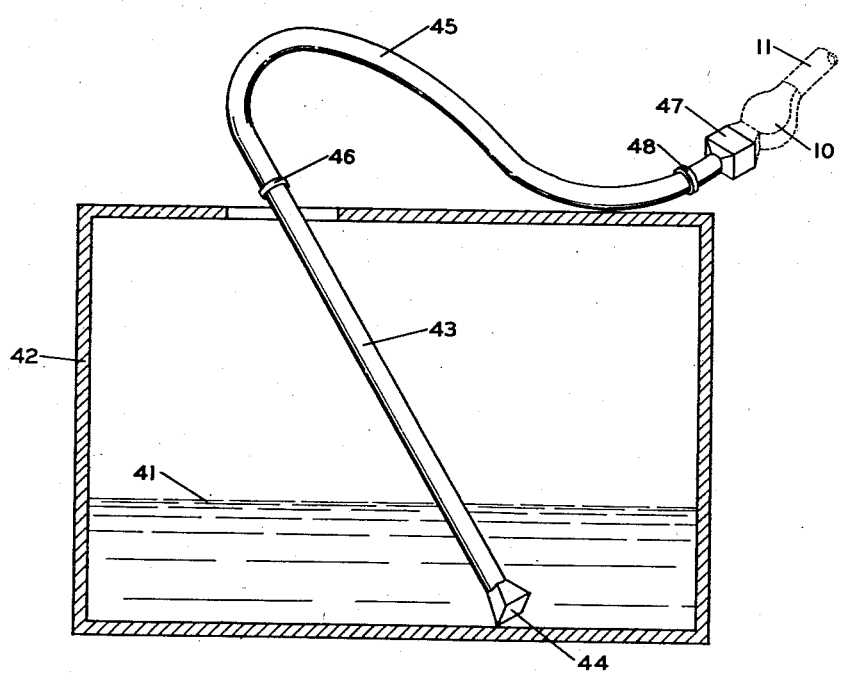
Figure 4 represents a tank and equipment which may be connected to my invention for use in evacuating the contents of the tank.

Figure 4 illustrates equipment which cooperates with the above described apparatus for use in evacuating the liquid contents 41 of a container 42. The essential elements are a section of tubing 43 having an intake 44; a flexible hose 45, which is united to tubing 43 by a coupling 46; and a fitting 47, that is joined to hose 45 by a coupling 48 and is adapted to receive inlet 15 so as to form a sealed connection with casing 10.

For the purpose of outlining the mode of operation of the instant invention, let us assume that the apparatus has been moved into a cooling tower pit and has been placed in position to remove liquid, scale, hard formations, and other accumulations of material. With all the valves completely closed, the operator now opens valves 28 and 26 and master valve 21, thereby placing the primary jet and the secondary jet in service. Liquid and solid material in the pit are drawn into inlet 15 and discharged through rotors 17 by the action of the primary jet. The rotors 16 are caused to revolve, due to the velocity of the fluid jet, and blades 17 will crush and break any solid material passing between the rotors to a size that will pass through outlet tube 11. The secondary jet assists the primary jet in forcing liquid and solid particles through the discharge hose 12 which may, if desired, lead directly to a dump truck or drainage ditch. Should inlet 15 or the interior of the casing proper become clogged with solid materials, either or both may be quickly cleaned out by first closing valves 26 and 28, and opening valve 29. This shuts off the primary and secondary jets and places the blow back line 25 in service. The fluid emitted by conduit 25 will force any accumulations in the casing or in the inlet out of the housing and back into the pit. As was explained earlier in this specification, conduit 23 may be employed to urge material through the housing; or by repositioning nozzles 33 and 34, so they will point outwardly of the housing inlet, the fluid pressure and velocity may be utilized to loosen and break up accumulations in the pit. It will be observed that when the nozzles are in the position illustrated, they supplement primary and secondary jets in performing the normal dredging operations.

When evacuating liquid from a sump pit or other container, the set-up illustrated in Figure 4 is recommended. Tubing 43 is inserted in container 42 so that intake 44 is positioned close to the bottom thereof. With master valve 21 and valve 29 opened and the other valves closed, the lines and housing are first filled with fluid from conduit 25 to serve as a primer. Valve 29 is now closed and valves 28 and 26 are opened, thereby placing the corresponding conduits in service. Flow through tube 43, hose 45, the housing, and discharge hose 12 will then take place. While this arrangement is intended primarily to evacuate liquids from containers, it will be evident that any solid material that may be entrained in the liquid will also be removed.

From the foregoing it is believed that the construction, operation and advantages of my present invention will be readily comprehended by persons skilled in the art. It is to be clearly understood, however, that the form of my invention herewith shown and described is to be taken as a preferred example of the same and that various changes in the shape, size and arrangement of parts may be resorted to without departing from the spirit of my invention as defined by the appended claims.

I claim:

1. In dredging apparatus, the combination comprising a housing, an inlet and an outlet in the housing, a high pressure fluid manifold, a plurality of conduits each having one end connected to the manifold, one of said conduits having its other end communicating with the interior of the housing and disposed therein so that fluid emitted therefrom will flow in the direction of the outlet, another of said conduits having its other end disposed in the housing so that fluid emitted therefrom will flow in the direction of the inlet, means in still another of said conduits for controlling the direction of flow of fluid emitted therefrom, valve means for regulating the passage of fluid through each of the above mentioned conduits, and rotatable crushing means within the housing.

2. In dredging apparatus, the combination comprising a housing, an inlet and an outlet in the housing, rotating crushing means within the housing, said crushing means including a rotor and a plurality of blades connected thereto and extending outwardly therefrom, a high pressure fluid manifold, a plurality of conduits each having one end connected to the manifold, a pair of said conduits having their other ends communicating with the interior of the housing and disposed therein on opposite sides of the crushing means so that fluid emitted therefrom will flow in the direction of the outlet, another of said plurality of conduits having its other end disposed in the housing so that fluid emitted therefrom will flow in the direction of the inlet, and valve means for controlling the passage of fluid through each conduit.

3. In dredging apparatus, the combination comprising a housing, an inlet and an outlet in the housing, rotary means within the housing, said rotary means including a pair of rotors and a plurality of blades extending tangentially from each rotor, a high pressure fluid manifold, a plurality of conduits each having one end connected to the manifold, a pair of said conduits having their other ends communicating with the interior of the housing and disposed therein so that fluid emitted from one of said conduits will flow in the direction of the outlet and fluid emitted from the other of said conduits will flow in the direction of the inlet, another of said plurality of conduits terminating proximate the inlet, means in the said last mentioned conduit to permit directional control of fluid emitted therefrom, valve means for regulating the passage of fluid through each conduit, and means for supporting the housing including a framework and rollers attached thereto.

FRED L. FENDER.